US006205931B1

(12) United States Patent
Degutis et al.

(10) Patent No.: US 6,205,931 B1
(45) Date of Patent: Mar. 27, 2001

(54) AERATOR PAD FOR FLUIDIZING PARTICULATE MATERIALS

(75) Inventors: Alex Degutis, East Chicago, IN (US); Brian Putnam, Bolingbrook, IL (US); Melissa Mandrona, Flower Mound, TX (US); Stan Brzezniak, Chicago, IL (US)

(73) Assignee: Salco Products, Inc., Lemont, IL (US)

( * ) Notice: Subject to any disclaimer, the term of this patent is extended or adjusted under 35 U.S.C. 154(b) by 0 days.

(21) Appl. No.: 09/300,051

(22) Filed: Apr. 27, 1999

(51) Int. Cl.[7] ....................................................... B61D 7/22
(52) U.S. Cl. ...................... 105/248; 105/282.2; 105/360; 277/650; 277/651
(58) Field of Search ........................ 277/630, 637, 277/650, 651; 105/248, 360, 282.2, 247

(56) References Cited

U.S. PATENT DOCUMENTS

| 1,974,633 | * | 9/1934 | Victor | 277/630 |
| 1,982,759 | * | 12/1934 | Rosen | 277/630 |
| 4,353,668 | | 10/1982 | Anderson . | |
| 4,428,585 | * | 1/1984 | Dugge | 277/12 |
| 4,677,917 | | 7/1987 | Dugge et al. . | |
| 4,846,377 | * | 7/1989 | Fiix et al. | 222/195 |
| 4,880,148 | * | 11/1989 | Schmidt | 22/195 |
| 5,314,094 | | 5/1994 | Dalske et al. . | |
| 5,829,358 | * | 11/1998 | Deaver | 105/280 |

* cited by examiner

Primary Examiner—S. Joseph Morano
Assistant Examiner—Frantz F. Jules
(74) Attorney, Agent, or Firm—Wood Phillips VanSanten Clark & Mortimer

(57) ABSTRACT

An aerator pad for a railroad hopper car has a fabric body member that overlies an aeration assembly slope sheet. The body member has a perimeter portion with indentations formed in the edges thereof. A gasket is molded to the perimeter of the body member. Bolt holes in the gasket are spaced from the fabric so that no edge or perimeter portion of the fabric is exposed to atmosphere. The gasket is located between mating flanges of the aeration assembly and car body. Spacer buttons lift the body member off the slope sheet and a wear pad prevents vibration induced deterioration at the gas inlet opening in the slope sheet.

10 Claims, 3 Drawing Sheets

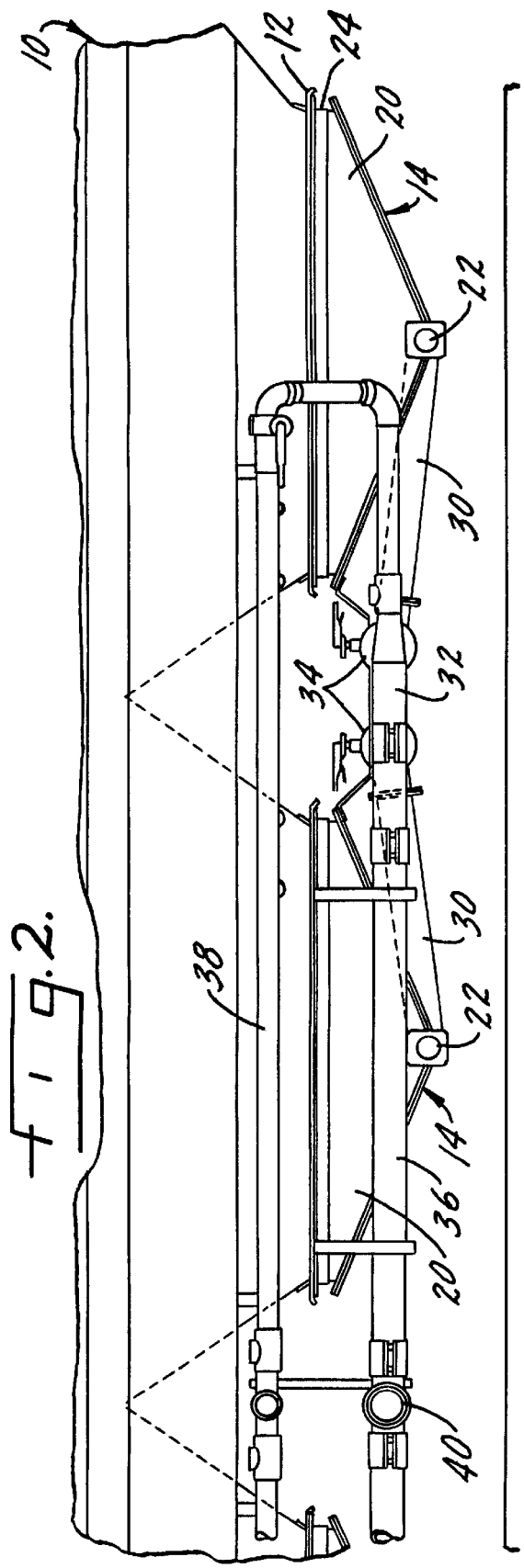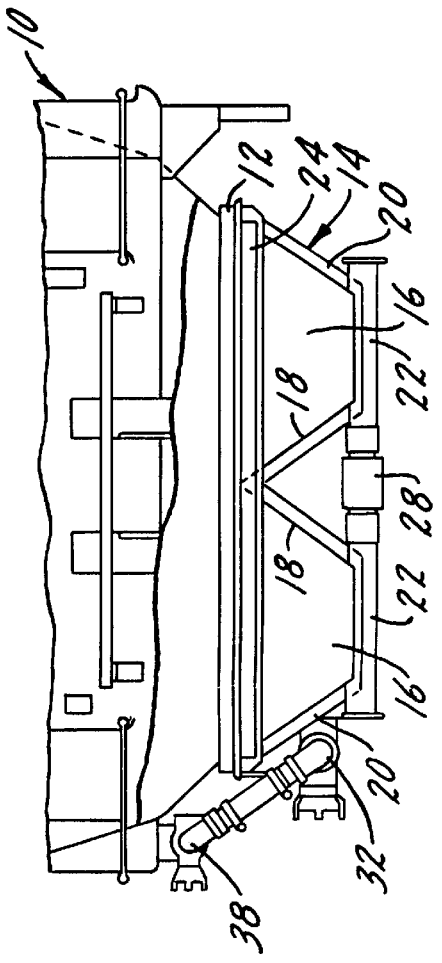

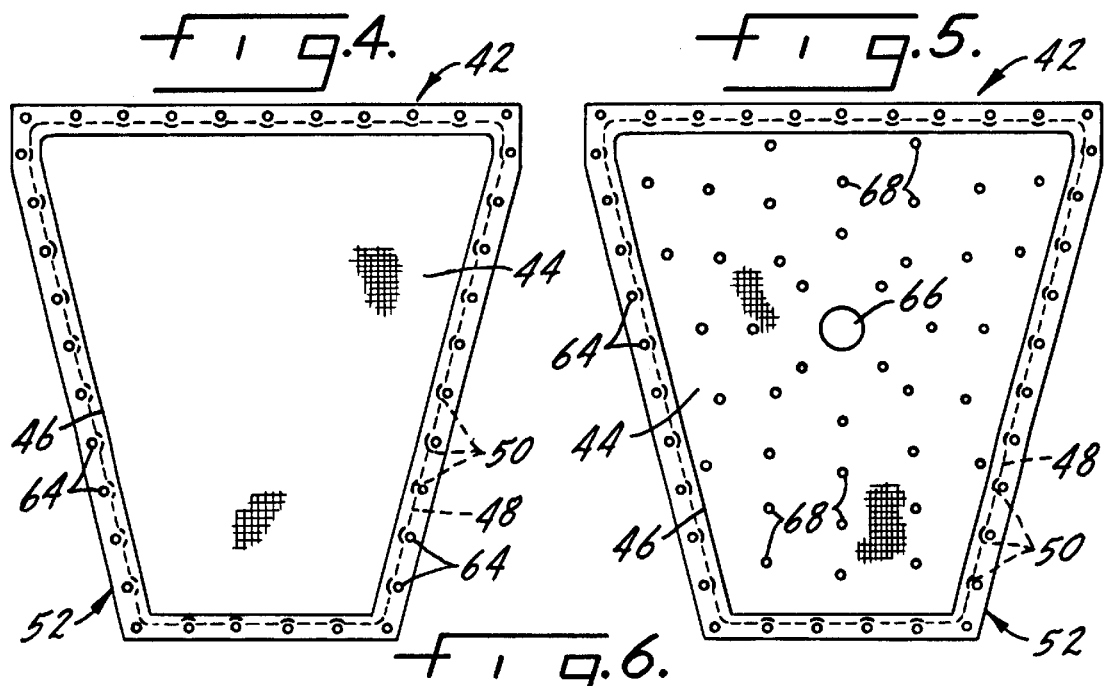
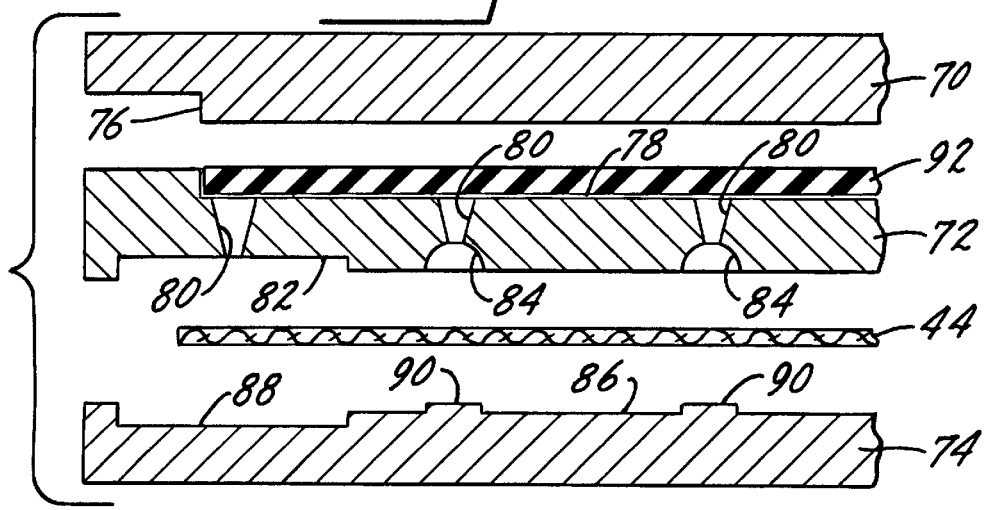
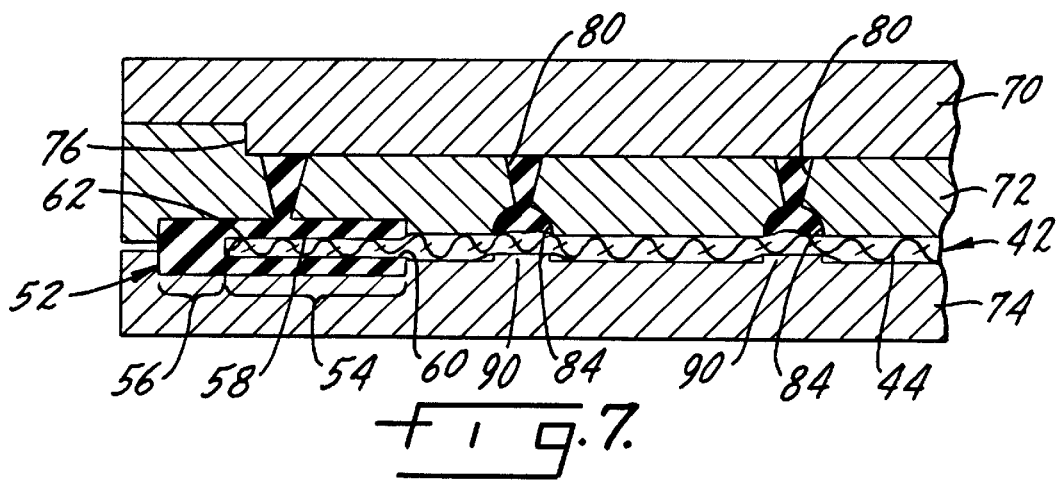

AERATOR PAD FOR FLUIDIZING PARTICULATE MATERIALS

BACKGROUND OF THE INVENTION

Railroad hopper cars generally have one or more compartments for receiving dry granular, powdered or particulate materials. For some types of service the bottom of each compartment may be provided with an aeration assembly. The aeration assembly is similar in function to a discharge gate except it is not generally intended that the aeration assembly will be removed and replaced the way a discharge gate might be. The aeration assembly is constructed with angled or sloped bottom walls called slope sheets which join a discharge trough or conveyor. The trough has an unloading opening therein. The aeration assembly may also include end sheets and central divider sheets. Flanges around the perimeters of the aeration assembly components have holes for bolting the parts together. Similarly, the entire aeration assembly is bolted to a frame on the underside of the car body.

The slope sheets are tipped up from the horizontal to direct the lading to the unloading opening in the trough. Thus, the slope sheets function somewhat in the nature of a funnel. The funnel effect of the slope sheets is sufficient to make certain types of particulate lading flow freely out the opening by gravity. Other kinds of lading, generally finer powders, tend to bind up and clog the unloading opening. They will not flow by gravity and thus require some form of encouragement to depart from the car. This problem has been exacerbated by recent efforts to increase the payload of hopper cars by decreasing the angle of the slope sheets with respect to the horizontal. Decreasing the angle of the slope sheets increases the capacity of the cars but also decreases the tendency of the lading to flow out the unloading openings solely by force of gravity. Introduction of an aerating gas into the compartment to fluidize the lading in the vicinity of the unloading opening has been found necessary to induce flow in cases of fine powders or decreased slope sheet angle. The aerating gas is usually air but some materials may require use of an inert gas for safe handling. In the absence of an abnormal condition that causes caking in the area of the unloading opening, the aerated lading will flow out the opening like water.

Aerating the compartment requires some provision for introducing gas into the compartment in the area of the unloading opening and the slope sheets. Placing aerating gas supply pipes inside the compartments is not preferred primarily because the pipes themselves become an obstruction to the flow of lading. Further, interior supply pipes reduce the volume available for the lading and they are more difficult to service. Thus, the aerating gas supply pipes are located on the exterior of the compartment where they communicate with ports formed in the slope sheets.

The presence of the ports in the slope sheets leads to the need for a device in the nature of a check valve to cover the ports. The "check valve" has to prevent the lading from flowing through the ports and into the aerating gas supply pipes during loading, transportation and storage of the loaded car, while permitting aerating gas to flow through the supply pipes and into the lading during unloading. Rubber pads, sometimes known as flow cones, on the interior of the slope sheets and covering each port can be used for some types of service. These gas-impermeable pads have a diameter somewhat greater than the port and they are mounted so as to be biased into contact with the slope sheet where they normally cover and block the port. The pads will flex upwardly into the compartment when the pipes are pressurized to admit aerating gas into the compartment. While these rubber pads are effective for lading such as PTE, they are not suitable for food service such as flour, sugar and baking powder.

Food service requires an alternative arrangement for covering the ports. One approach that has been used for aerating is a permeable fabric pad. To increase dispersion of the gas throughout the slope sheet a metal separator plate has been placed between the fabric pad and the slope sheet. The separator is spaced from the slope sheet and has a plurality of apertures therein. The fabric pad sits on top of the separator. The aerating gas is introduced underneath the separator plate and flows up through the apertures and through the fabric pad into the lading. A later approach to slope sheet aeration dispensed with the separator plate and placed a fabric pad directly on the slope sheet. Fabric spacers sewn into the central portions of the pad lifted the pad off the slope sheet to increase gas dispersion.

One of the issues raised by the presence of the fabric pad is how to secure it in place. Since there were already mating flanges associated with the car body and aeration assembly, it made sense to extend the pad to this structure and clamp it between the mating flanges. However, it was immediately discovered that the pad not only transmits aerating gas normal to its surface, but parallel thereto as well. Gas leaked out the edges of the pad to the exterior of the compartment. This leakage could be so severe as to prevent proper pressurizing of the car for unloading. A messy, labor-intensive work-around was to apply a sealant to the edges of the pad after it was installed between the flanges. Another approach to solve the edge leakage problem was an extruded rubber gasket sewn to the perimeter of the pad. See U.S. Pat. No. 4,428,585. The corners of this gasket were mitered and glued. The gasket and pad were secured between the mounting flanges of the slope sheet and its supporting structures. Bolt holes extended through both the gasket and the underlying fabric. However, the pad still leaked aerating gas to atmosphere through the bolt holes, the sewn seams and the glued gasket joints. Washers surrounding the bolts provided only partial relief to the leakage problem.

SUMMARY OF THE INVENTION

The present invention is directed to an improved aerator pad for hopper car aeration assemblies. The aerator pad of the invention disperses aerating gas to the interior of the car while preventing leakage of pressurized gas to the exterior of the aeration assembly. The edges of the pad are fully sealed against gas flow. The aerator pad has a scalloped edge of fabric providing increased holding ability between the bolt holes. Spacer buttons on the bottom side of the pad enhance gas dispersion underneath the pad. A central wear pad molded to the pad increases resistance to vibration induced wear.

The pad is constructed of a body member made of gas permeable fabric. A molded rubber gasket surrounds the perimeter of the body member. The gasket has a sealing portion where the rubber portion fully surrounds the edges of the fabric, and a mounting portion that is all rubber and no fabric. Bolt holes for mounting the pad are located in this mounting portion of the gasket, remote from the fabric. Thus, no edge of the fabric is exposed to atmosphere. Rubber buttons are spaced through the body member to lift it off of a slope sheet. A central wear pad of rubber is molded to the center of the body member.

An improved method of manufacturing the aerator pad includes the steps of compressing the fabric adjacent the gasket during molding. This prevents the fabric from floating. Extra compression is also applied at the rubber buttons during molding to improve the bond between the fabric and the buttons.

BRIEF DESCRIPTION OF THE DRAWINGS

FIG. 2 is a side elevation view of two hopper car aeration assemblies.

FIG. 3 is an end elevation view of a hopper car aeration assembly.

FIG. 4 is a top plan view of an aerator pad according to the present invention.

FIG. 5 is a bottom plan view of the aerator pad.

FIG. 6 is an exploded view of an aerator pad and a tool for making it.

FIG. 7 is a section through a portion of a tool for making an aerator pad showing the tool closed and with an aerator pad in the tool.

DETAILED DESCRIPTION OF THE INVENTION

Figure 1:
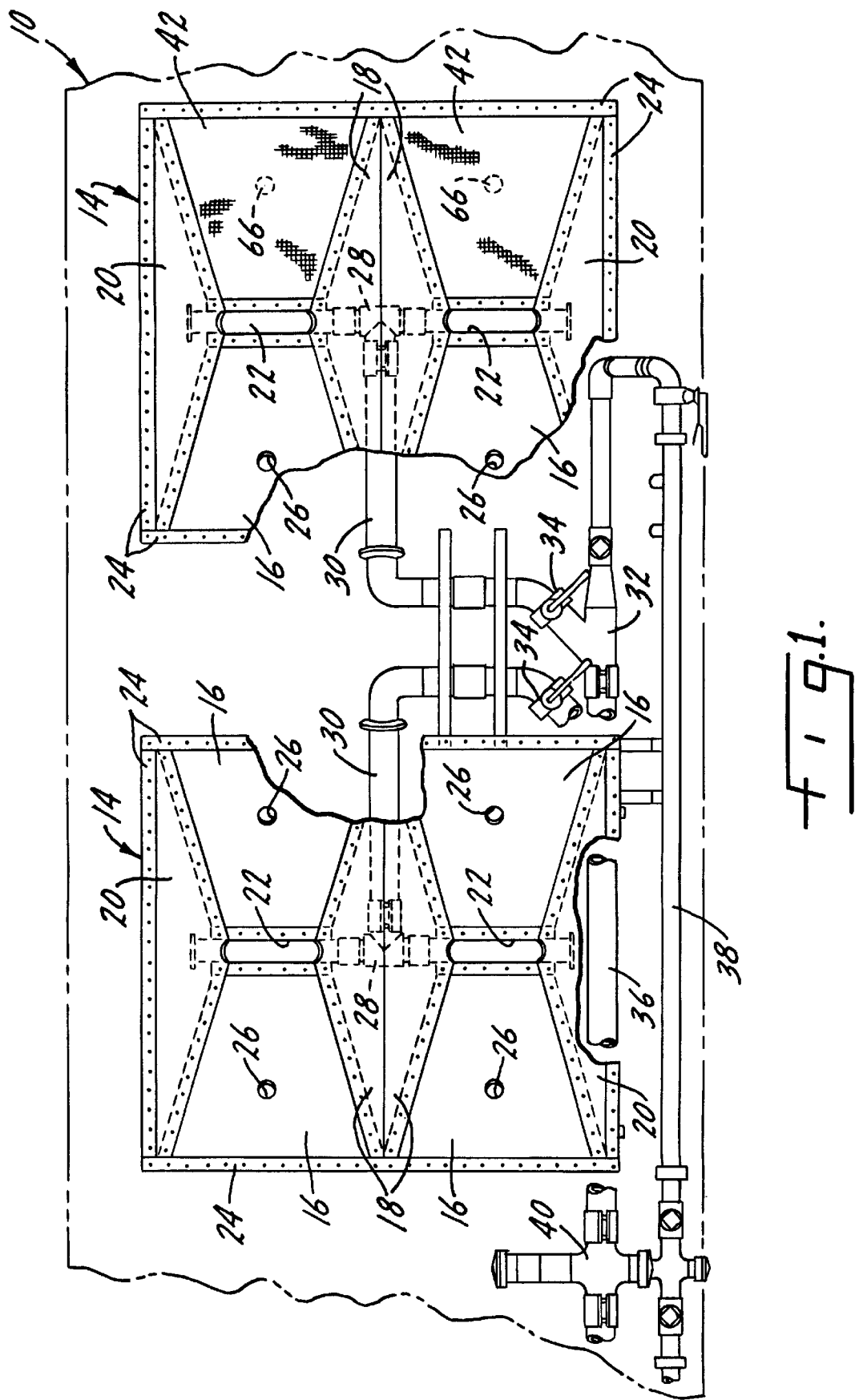
FIG. 1 is a top plan view of the bottom or floor of a hopper car interior.

FIGS. 1–3 illustrate portions of the bottom of a railroad hopper car. The hopper car body is shown schematically at 10. The interior of the car body is divided into compartments, two of which are shown here. Car body flanges 12 near the bottom of each compartment mount an aerator assembly 14. The aerator assemblies comprise four inclined slope sheets 16 which are bounded by and joined to central divider sheets 18 and end sheets 20. All of the sheets 16, 18 and 20 slope downwardly to a central trough 22. The trough is actually a pair of half pipes fastened to the underside of the slope sheets with the top portion of the pipe open to the interior of the car body. The upper edges of the slope sheets 16 and the end sheets 20 have horizontal flanges 24 which mate with the car body flanges 12. A plurality of bolts connect the flanges 24 of the aerator assembly to the car body flanges 12. A gasket portion of the aerator pad of the invention fits between the flanges as described below.

Each slope sheet 16 has an opening 26 therein. These openings are connected to gas supply pipes (not shown) on the exterior of the car. Gas is introduced into the aerator assembly through these openings for the purpose of aerating the lading in the car.

The troughs 22 connect to a tee 28 which is on the exterior of the car beneath the divider sheets 18. The tee connects the two troughs to a discharge pipe 30. The discharge pipe extends to a Y-connector 32 through a butterfly valve 34. The Y-connector is part of a product outlet pipe 36. The product outlet pipe 36 is supplied with air from an aeration manifold 38. Outlet pipe 36 extends to a discharge cross assembly 40. During unloading product flows from troughs 22 to the tee 28 and out through the discharge pipe 30, Y-connector 32 and outlet pipe 36. The discharge cross assembly 40 is connectable to a suitable hose or conduit, which is part of the unloading facilities, for receiving the unloaded product.

Turning now to FIGS. 4 and 5, the aerator pad of the present invention is shown generally at 42. There is an aerator pad associated with each slope sheet. The pad includes a body member 44 made of gas permeable fabric. The body member shown is trapezoidal in shape to generally match the shape of the slope sheets 16. A preferred fabric is a three ply, solid woven cotton with air permeability of 2.3–2.9 standard cubic feet per minute. Polyester or a cotton\polyester blend are alternative fabrics. In a preferred embodiment, the fabric is about 5/32" thick. The body member includes a perimeter portion 46 which terminates at edges 48. The edges have a plurality of indentations 50. The indentations provide a wavy or scalloped edge to the fabric of the body member.

A gasket 52 surrounds the perimeter portion of the body member. The gasket is made of elastomeric, gas impermeable material such as neoprene or SBR rubber. Polyurethane or polyvinyl are possible alternate gasket materials. The gasket thickness is 0.125" on each side of the fabric giving an overall thickness of the part including fabric and gasket of about 0.41".

Details of the gasket 52 are best seen in FIG. 7. The gasket has a sealing portion 54 and a mounting portion 56. The sealing portion has upper, lower and edge contact surfaces 58, 60 and 62. These surfaces are molded into the fabric of the body member 44 such that the elastomeric material of the contact surfaces impregnates the surface fibers of the perimeter portion. This bonds the gasket to the fabric and prevents gas flow out the perimeter and edges of the body member.

The mounting portion 56 of the gasket has a plurality of attachment elements 64. The attachment elements are provided for securing the aerator pad to the aerator assembly of the car. In a preferred embodiment, the attachment elements are a series of holes which receive bolts that fasten the flanges 12 and 24 of the car body and aerator assembly, respectively. The holes are spaced from the edges of the body member. Preferably, the holes are aligned with one of the indentations 50 in the edge of the body member. This location of the holes provides greater assurance that no part of the fabric will be exposed to the holes 64.

A wear pad 66 is located approximately in the center of the body member 44. In a preferred embodiment, the wear pad is a molded rubber circle, about 3 to 3½" in diameter by 1/32" thick. The wear pad is located such that it is adjacent the slope sheet opening 26. The wear pad prevents aerating gas from going straight through the fabric. It forces the gas to spread throughout the body member 44. Also, it has been found that there is a good deal of vibration at the wear pad. In the absence of the wear pad, the vibration deteriorates the fabric opposite the opening far faster than the other portions of the body member. The wear pad protects this vital portion of the fabric thereby extending the useful life of the aerator pad. Furthermore, sometimes a flow cone is placed underneath the aerator pad 42 to cover the opening 26. A flow cone makes the vibration-induced wear problem even worse and the wear pad 66 that much more important.

A plurality of spacer buttons 68 are located throughout the underside of the body member 44. Each button is a semispherical piece of rubber which is molded into the fabric. A diameter of about ½" has been found suitable although it could be otherwise. The purpose of the spacer buttons is to support the fabric spaced from the slope sheet to allow the distribution of air flow throughout the entire body member. The size and shape of the spacer buttons is such that they will not impede air flow between the fabric and the slope sheet.

FIGS. 6 and 7 illustrate a preferred method of forming the aerator pad. This transfer molding process includes preparing top, center and bottom plates 70, 72 and 74. The top plate 70 includes a plunger 76. It is sized to fit snugly within a raw stock cavity 78 formed in the upper surface of the center plate 72. A plurality of sprue passages 80 extend through the center plate 72 from the raw stock cavity 78 on the upper surface to either a gasket cavity 82, button cavities 84 or a wear pad cavity (not shown) on the lower surface of plate 72. The gasket cavity 82 extends around the outside of the tool. The button cavities are located throughout the center plate 72.

The bottom mold plate 74 also has a body receiving plate 86 on its upper surface. The body receiving plate includes a gasket cavity 88 and a plurality of shims 90. The shims 90 are located generally opposite the button cavities 84. One of the gasket cavities may also include pins (not shown) for forming the attachment element holes 64.

Having prepared the mold tool as described, formation of an aerator pad is as follows. A piece of fabric is cut to the desired shape of a body member with the indentations as described above. The body member is then laid over the body receiving plate 86 in bottom plate 74. The perimeter of the body member extends into the gasket cavity 88. Next a raw rubber blank 92 is placed into the raw stock cavity 78 of the center tool 72. Then the press is closed causing the center tool 72 to close on the bottom plate 74. As seen in FIG. 7, when the tools are closed the center and bottom plates 72 and 74 will compress the fabric member in the majority of its area to a first pressure. This prevents the fabric from floating around in the gasket cavity during the transfer phase. Next the top plate 70 closes on the center plate, causing the plunger 76 to force the raw stock through the sprues 80 to the cavities 82 and 84 and the wear pad cavity. This is known as the transfer phase because the raw stock is transferred from one cavity to another.

The part is allowed time to cure. During this time the shims 90 apply extra pressure to the fabric at the locations of the button cavities 84. This assures good adherence between the buttons and the fabric. The elastomeric material is impregnated into the fibers at the surface of the fabric. After curing the press is opened and the finished part is removed. The flash pad which is left in the raw stock cavity is removed and the process restarts.

The molded rubber gasket seals the perimeter portion of the fabric body member and prevents gas flow out of the perimeter portion. The scalloped edge of the fabric has the benefit of increasing the rubber's grip on the fabric and increasing the pull out strength.

In use the gasket has a size and shape that allows it to fit between the flanges 12 and 24 of the car body and aerator assembly. Thus, the gasket completely seals the space between the flanges and prevents escape of aeration gas through the flanges. Likewise, since the fabric is completely encapsulated in the rubber gasket, air cannot flow through the fabric laterally and escape out either the edges or the perimeter portion of the fabric. This allows the car body to be pressurized to the necessary 10–15 psig.

The aerator pad of the present invention has the advantage that all of the gasket is of a molded construction, eliminating any glued or sewn joints. The spacer buttons permit even air distribution throughout the slope sheet while the wear pad extends the life of the aerator pad by eliminating wear at the most vulnerable portion of the fabric.

While a preferred form of the invention has been shown and described, it will be realized that alterations and modifications may be made thereto without departing from the scope of the following claims.

We claim:

1. An aerator pad, comprising:
   a body member made of gas permeable fabric with fibers located therein, the body member including a perimeter portion which terminates at edges;
   a gasket made of gas impermeable material, the gasket having a sealing portion and a mounting portion, the sealing portion having contact surfaces impregnated into the fibers of the perimeter portion and the edges of the body member without penetrating the body member so as to prevent gas flow out of the perimeter and edges, the mounting portion being located beyond the edges of the body member; and
   a plurality of attachment elements in the mounting portion of the gasket spaced from the body member.

2. The aerator pad of claim 1 further comprising a plurality of indentations formed in the edges of the perimeter portion to increase the area of engagement between the edges and the contact surfaces of the sealing portion.

3. The aerator pad of claim 2 wherein the attachment elements are aligned with the indentations.

4. The aerator pad of claim 1 wherein the attachment elements are holes through the mounting portion of the gasket.

5. The aerator pad of claim 1 further comprising a plurality of spacer buttons attached to an underside of the body member remote from the perimeter.

6. The aerator pad of claim 1 further comprising a wear pad attached to an underside of the body member remote from the perimeter.

7. In a railroad hopper car of the type having a car body including a frame with flanges on the underside of the car body, an aeration assembly having flanges around a perimeter thereof for attaching the aeration assembly to the flanges of the frame, the aeration assembly being constructed with angled slope sheets which join a trough having an unloading opening therein, the slope sheets having openings therein connected to gas supply pipes, the improvement comprising an aerator pad, comprising:
   a body member made of gas permeable fabric, the body member including a perimeter portion, the body member arranged to overlie a slope sheet and said slope sheet opening therein;
   a gasket made of gas impermeable material attached to the perimeter of the body portion, the gasket arranged to fit between the flanges of the aeration assembly and the frame; and
   a wear pad attached to the body member in facing relation with the slope sheet opening.

8. The aerator pad of claim 7 further comprising a plurality of spacer buttons attached to the side of the body member facing the slope sheet, the spacer buttons being engageable with the slope sheet to support at least a portion of the body member in spaced relation to the slope sheet.

9. The aerator pad of claim 7 further comprising a plurality of indentations formed in the edges of the perimeter portion.

10. The aerator pad of claim 9 further comprising bolt holes formed in the gasket, the bolt holes being aligned with the indentations.

\* \* \* \* \*